United States Patent [19]

Fukunaga

[11] Patent Number: 4,948,946
[45] Date of Patent: Aug. 14, 1990

[54] ELECTRIC SOLDERING IRON WITH DIRECTED AIR FLOW FOR FUME DISSIPATION

[76] Inventor: Akio Fukunaga, 4623 Sunnyhill St., Westlake, Calif. 91362

[21] Appl. No.: 99,724

[22] Filed: Sep. 22, 1987

[51] Int. Cl.⁵ .......................... B23K 3/02; H05B 1/00
[52] U.S. Cl. .................................. 219/230; 219/236; 219/370; 219/373; 228/51; 228/20 HT
[58] Field of Search ..................... 228/51-55, 228/57, 20 R, 20 HT; 219/230, 236, 227, 373

[56] References Cited

U.S. PATENT DOCUMENTS

| | | |
|---|---|---|
| 2,041,018 | 5/1936 | Persons ........................... 219/230 X |
| 2,184,980 | 12/1939 | Smith . |
| 3,080,470 | 3/1963 | Davis . |
| 3,121,781 | 2/1964 | Schoenwald . |
| 3,134,884 | 5/1964 | Bean, Jr. . |
| 3,141,088 | 7/1964 | Johnson ............................. 219/236 |
| 3,422,247 | 1/1969 | Royston et al. ..................... 219/230 |
| 3,980,218 | 9/1976 | Fortune ................................ 228/20 |
| 4,358,662 | 11/1982 | Cranor et al. ...................... 219/230 |
| 4,419,566 | 12/1983 | Fortune ............................... 219/230 |

FOREIGN PATENT DOCUMENTS

| | | | |
|---|---|---|---|
| 2586599 | 3/1987 | France .............................. 219/230 |
| 644758 | 9/1962 | Italy ................................. 219/230 |
| 60-148667 | 8/1985 | Japan ................................ 219/230 |

Primary Examiner—Anthony Bartis
Attorney, Agent, or Firm—Henry M. Bissell

[57] ABSTRACT

A miniature light-weight electric soldering iron includes a hollow handle terminating in a conical air deflecting arrangement through which a cone-shaped curtain of relatively high velocity air is applied to the work area in a circular or elliptical region surrounding the point at which molten solder is being applied by the hot soldering iron tip thereby entraining and dissipating noxious fumes which may be generated from the soldering flux by the hot soldering iron tip. In one embodiment, the soldering iron handle is provided with a plurality of wall air inlet openings and a tiny motor and fan are incorporated to draw air into the handle through these openings and then direct it out through a truncated cone-shaped deflector to develop the air curtain. In another arrangement, the motor and fan are dispensed with and the cone-shaped deflector is coupled to a convenient pressure source, such as an air line. The flow of air further serves to maintain the handle at a comfortably cool temperature.

15 Claims, 2 Drawing Sheets

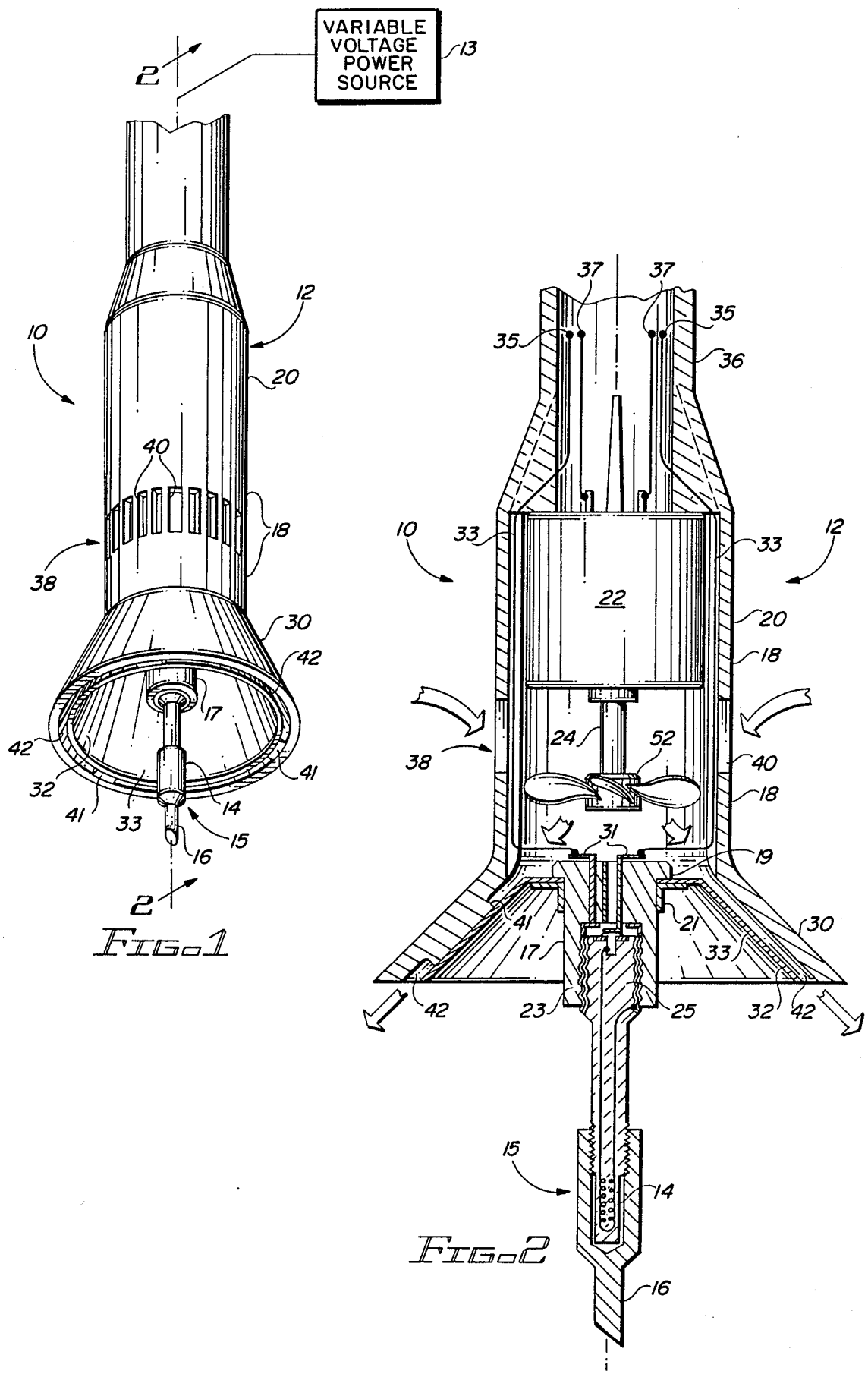

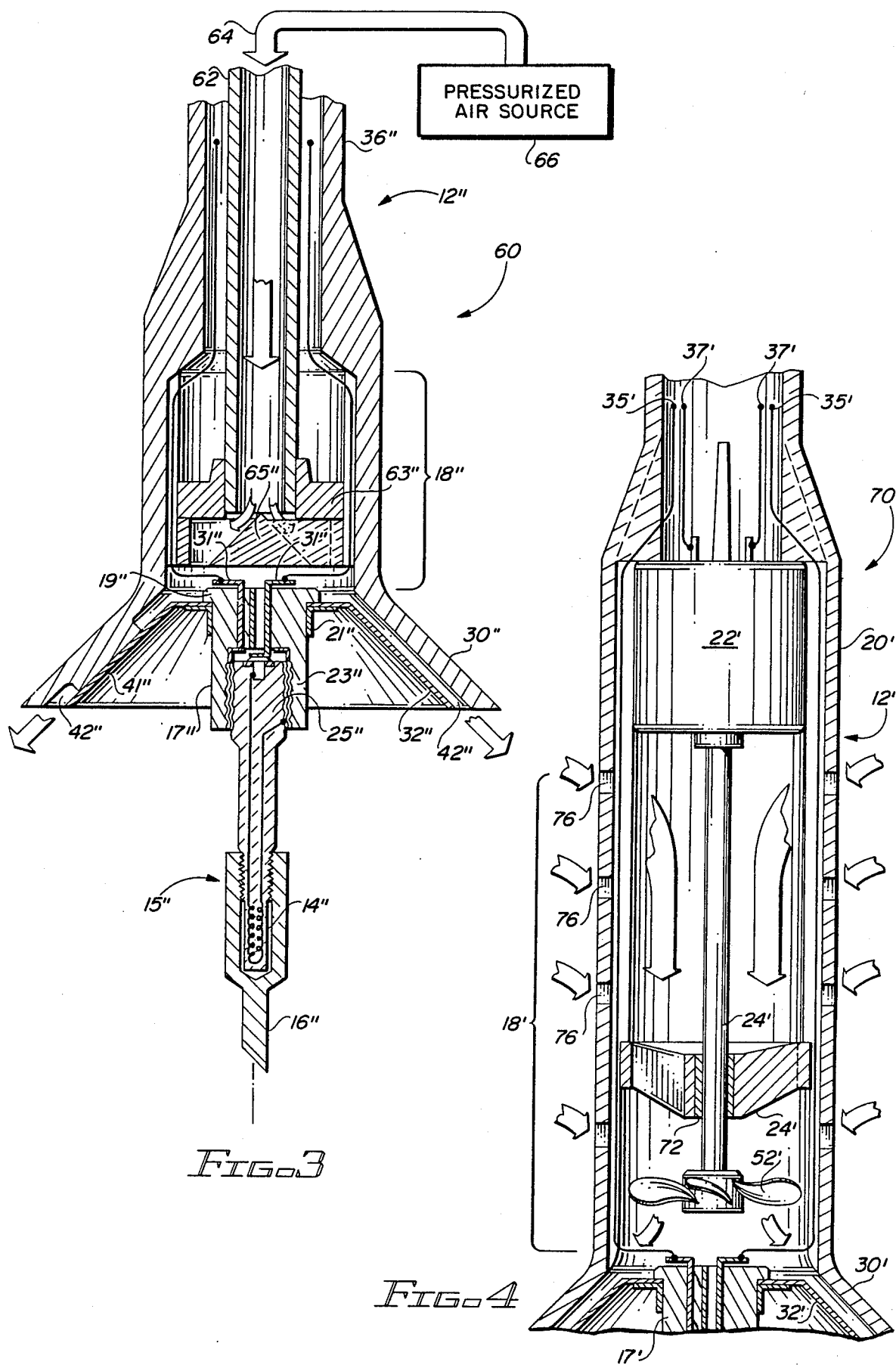

ELECTRIC SOLDERING IRON WITH DIRECTED AIR FLOW FOR FUME DISSIPATION

BACKGROUND OF THE INVENTION

1. Field of the Invention.

This invention relates to soldering irons and, more particularly, to improved soldering irons providing an air current directed toward the vicinity of the work.

2. Description of the Prior Art.

Despite current improvements in technology which permit the automated production of electronic equipment, printed circuit boards and the like, there are still fields of application where human operators are required to use electrically heated soldering irons on production lines for electrical apparatus. There are two principal problems which relate to the use of soldering irons in this fashion.

One problem relates to the noxious fumes which are developed from the vaporizing of solder flux as the flux is used in conjunction with the soldering process. There are also fumes from the overheating of wire lead insulation to contend with. Flux is commonly used during the soldering step to control the oxidation of the parts being joined so that the solder will develop a better joint. This flux, usually in resin or paste form and sometimes constituting the core of hollow core soldering wire, is somewhat caustic, particularly when heated, and the fumes are extremely noxious, even to the point of being hazardous for human operators to breathe. Yet the flux is a necessary ingredient in the forming of a good solder connection.

Another problem relates to the heat generated in the soldering process. The soldering iron is usually maintained at an elevated temperature for hours at a time, ready for use by the operator in completing the soldered connections. It is desirable to make the tip of the soldering iron, including the heating element extending from the handle to the tip, fairly short, in order to reduce the cantilevered weight which is supported from the handle and thus reduce the fatigue experienced by the operator from continually manipulating the soldering iron for long periods of time. However, having a short tip and heating element of the soldering iron merely exacerbates the problem of heat from the tip reaching the handle during long periods of operation. Efforts have been made to reduce the heat which reaches the handle from the tip by providing heat deflectors or radiators, such as fins encircling the heating element, and similar arrangements. These tend to defeat their intended purpose, however, since they add weight to the cantilevered portion of the soldering iron, even though they may permit a shorter cantilevered portion in a soldering iron designed for continuous operation.

The prior art contains a number of examples of attempts to solve one or another of the problems associated with the use of an electrically heated soldering iron. U.S. Pat. No. 3,121,781 of Schoenwald discloses an electrically heated soldering iron having a specially constructed handle which is designed to accomplish convection cooling. A plurality of vents are strategically located in conjunction with hollow spaces within the handle so that air is vented to flow into the interior of the handle and outwardly through some of these vents under the influence of convection.

U.S. Pat. No. 3,141,088 of Johnson discloses a handle configuration having provision for air spaces between the finger grip portion of the handle and the heating element of the soldering iron. The special structural configuration of U.S. Pat. No. 3,134,884 of Bean, Jr. includes a hollow handle portion, particular metal parts of stainless steel between the handle and the heating element for limiting the transfer of heat towards the handle and of aluminum within the handle itself for spreading and distributing the heat within the handle away from the finger grip portion, as well as a pair of disk radiators situated between the heating element and the handle to protect the user's fingers from radiated heat emanating from the heating element.

Cranor et al in U.S. Pat. No. 4,358,662 disclose an arrangement for exhausting fumes from the vicinity of a soldering iron tip. This is in the form of a fume exhausting attachment which may be mounted coaxially of the heating element barrel, adjacent the tip, with provision for connection to a vacuum source so that objectionable fumes, gases, smoke and other airborne contaminants may be withdrawn from the soldering site.

Other patents of but slight interest to the concepts of the present invention include U.S. Pat Nos. 3,980,218 and 4,419,566 of Fortune relating respectively to a vacuum desoldering system and a hot air soldering and resoldering system, and U.S. Pat. No. 3,080,470 of Davis which discloses a portable-gun-type spot welder with provision for directing cooling air at the welder tip to protect it against overheating.

Insofar as the known prior art is understood, none of these patents discloses any arrangement operating in the manner of the present invention, nor does any patent disclose any arrangement for dealing simultaneously with the two principal problems outlined above in the use of manually operated soldering irons.

SUMMARY OF THE INVENTION

In brief, arrangements in accordance with the present invention comprise an electrically heated soldering iron having a hollow handle in a configuration terminating in an air deflecting arrangement through which air is directed around the soldering iron heating element and tip in a generally hollow cone. This cone of relatively high velocity air is applied to the work area in a circular or elliptical region surrounding the point at which molten solder is being applied by the tip. From there, the air flows outwardly along the work in all directions. Any fumes from heated flux at the point of application of the melted solder are diverted and immediately dissipated by the hollow cone of high velocity air just as soon as the fumes become entrained into the airstream. The airflow through the hollow handle and the deflector which is located between the handle and the heating element effectively picks up heat which would otherwise transfer to the handle from the heating element, thus maintaining the handle including the finger grip portions at a comfortably cool temperature.

In one embodiment of the invention, the airflow through the handle and outwardly past the deflector is directed by a small multibladed fan driven by a tiny electric motor mounted within the hollow handle. The motor may be mounted adjacent the fan near the deflector element at the forward end of the handle or, if preferred as, for example, for weight balancing considerations, it may be mounted within the handle at a position remote from the fan and deflector with an elongated shaft extending from the motor to the fan.

In another particular arrangement in accordance with the present invention, the motor and fan may be replaced by a tube which extends along the axis of the handle and connects via flexible tubing to a source of pressurized air, thus providing a flow of air at positive pressure through the deflector elements to generate the hollow cone of air surrounding the point of application of the molten solder on the work piece.

BRIEF DESCRIPTION OF THE DRAWING

A better understanding of the present invention may be realized from a consideration of the following detailed description, taken in conjunction with the accompanying drawing in which:

FIG. 1 is a schematic view of a portion of one particular arrangement in accordance with the present invention;

FIG. 2 is a cross-sectional schematic view of the arrangement of FIG. 1, taken along the line 2—2 looking in the direction of the arrows;

FIG. 3 is a cross-sectional schematic view of an alternative embodiment of the invention; and FIG. 4 is a cross-sectional schematic view of a modification of the arrangement of FIG. 2.

DESCRIPTION OF THE PREFERRED EMBODIMENT

The schematic view of FIG. 1 shows a soldering iron 10 in accordance with the present invention which may incorporate any one of the various embodiments shown in FIGS. 2-4. Considering first FIGS. 1 and 2, a first embodiment of the invention in the form of a soldering iron 10 is shown comprising a handle 12, a heating element 14 and a soldering iron tip 16, the latter being preferably of copper and tinned in customary fashion. A remote power source 13, preferably variable in output voltage, is indicated as being connected to the soldering iron 10 via the upper end of the soldering iron handle, which has been omitted for simplicity.

The handle 12 contains a finger grip portion 18 which is generally coextensive with a motor housing or enclosure 20, somewhat enlarged in diameter, within which is positioned a small electric motor 22 having a shaft 24 mounted coaxially within the soldering iron 10. A bladed fan 52 is mounted on the shaft 24 for rotation therewith when the motor 22 is energized.

Extending downward and outward from the finger grip portion 18 are a pair of deflector elements 30, 32. These elements are shaped generally in the form of hollow truncated cone segments and serve to direct air which is driven by the fan 52 outwardly through the circumferential openings 42 in a hollow cone-shaped stream.

As part of the enclosure for the handle 12 between the fan 52 and the motor 22, there is an air intake section 38 which is perforated about its periphery to provide a plurality of holes 40 for permitting air to enter the hollow space within the motor enclosure 20.

The deflector element 30 is shown as an extension of the finger grip portion 18 and may be formed integrally therewith in a plastic molding process. The deflector element 32 as shown is a metal or metallized member which may be stamped of stainless steel, for example, and which has at least its downwardly facing surface 33 highly polished to provide maximum reflection of heat radiating from the end 15 of the soldering iron containing the heating element 14 and tip 16. If formed of plastic, the member 32 is preferably metallized with its downwardly-facing surface 33 comprising a vapor-deposited mirror layer of nickel chrome or equivalent metal.

The member 32 provides the support for the end 15 of the soldering iron 10 by a mounting arrangement in which a base 17 having a shoulder portion 19 is extended through a central opening in the member 32 and retained by an annular spring clip or collar 21. In the embodiment depicted in FIG. 2, the base 17 is shown with a threaded socket 23 for receiving a threaded base 25 which serves to support the heating element 14 and provide the electrical connections thereto through the base 17. Terminals 31 in the base 17 are connected to electrically conducting wires 33 which are led through longitudinal recesses within the handle 12 to terminations 35 where they may be connected, together with terminations 37 that connect to the circuit of the motor 22, to the source of power 13. The deflector element 32 is affixed, as by adhesive or epoxy, for example, to a plurality of projecting supports 41 which are preferably integrally molded with the deflector element 30. Thus the plurality of thin peripheral openings 42 are defined as extending between adjacent supports 41. The supports 41 are sufficiently narrow that insignificant interference with the stream of air exiting through the openings 42 is developed.

In use, the motor 22 is powered when the heating element 14 is energized to heat the soldering iron tip 16. The motor 22 drives the fan 52, thereby drawing air inwardly through the apertures 40, downwardly past the fan 52 and then outwardly through the peripheral spaces 42 between the deflectors 30, 32. When the air is driven in this fashion, the air exits the peripheral spaces 42 in a hollow cone-shaped flow, substantially blanketing and surrounding the work site so that any fumes generated from the use of the hot solder tip at the work site become entrained in the cone-shaped air curtain and are both diffused and directed away from the work site, thereby being removed from the location of the operator. As a further benefit from the use of the disclosed embodiment of the invention, the flow of air along the upper surface of the metal deflector 32 serves to remove heat therefrom, cooling the deflector 32 and enhancing its effectiveness as a barrier to heat from the soldering iron flowing toward the handle 12, in addition to its function in deflecting and directing the airstream to the work site.

The embodiment of FIG. 3 is similar in most respects to that of FIG. 2 and, where like components are included, like reference numerals are employed with the addition of a double prime superscript. FIG. 1 may serve as a schematic view for the arrangement depicted in FIG. 3 if the openings 40 are closed so that the section 38 is shown as a solid housing wall continuing between the two finger grip portions 18.

Thus, FIG. 3 shows a soldering iron 60 comprising a handle 12", a heating element 14" and a soldering tip 16" with deflector elements 30", 32" and supports 41 defining spaces 42" through which air flows outwardly to form a hollow cone-shaped curtain of air surrounding the soldering tip 16". The handle portion 12" comprises a finger grip section 18" and a stem section 36".

Within the length of the hollow handle 12" is a tube 62 which is coupled to a flexible tubing (indicated by the arrow 64) leading to a source of pressurized air 66. The tube 62 is supported at the lower end thereof within the handle 12" by a support arrangement 63 which is shaped to define a conical air deflector 65. Air from the pressure source 66 is directed through the tubing 64, central tube 62 and deflector 65 to the spaces 42" where it exits the soldering iron in the hollow cone as described. Airflow may be controlled by a manually-operated valve, not shown, or by activating a compressor for the pressure source 66 when it is desired to establish the cone-shaped curtain of flowing air surrounding the work site contacted by the soldering iron tip 16".

FIG. 4 depicts still another embodiment of a soldering iron 70 similar to those of FIGS. 2 and 3 with like components being designated by like reference numerals with the addition of a prime superscript. Thus, in FIG. 4 a soldering iron 70 is shown having a handle 12' comprising a hollow cylindrical housing 20'. The heating element and soldering tip, as well as the lower portion of the deflectors, have been omitted because of space limitations but it will be understood that these elements are identical to corresponding elements shown in FIG. 2. In this embodiment, a motor 22' is shown mounted near the upper end of the handle 12' within the housing 20' and having an extended shaft 24' which extends from the motor 22' through a bearing 72 to a fan 52'. The bearing 72 is supported in a bearing support bracket 74 which has a plurality of openings to permit air driven by the fan 52' to pass through. The finger grip portion 18' has a plurality of openings 76 for admitting air, as indicated by the arrows, into the interior of the hollow handle 18'.

Thus, arrangements in accordance with the present invention provide an extremely small but effective soldering iron designed particularly for production line use in connecting components to printed circuit boards and the like. The inventive embodiments direct a thin cone-shaped curtain of relatively high velocity air to surround the tip of the soldering iron where fumes are generated. As such fumes arise from the work area in the immediate vicinity of the soldering tip, they become entrained in the curtain of air and are quickly diffused and dissipated so that the soldering iron operator is not exposed to them in concentration.

The arrangements for generating the air curtain are miniaturized elements which do not add materially to the weight and size of the soldering iron. For example the diameter of the handle portion of the soldering iron 10 of FIG. 1 preferably does not exceed one inch in diameter, thus enabling it to be easily and comfortably held by the user. The cone-shaped shell passages for air flow between the inner and outer deflector are thin, typically approximately 0.02 inches in lateral dimension, so that a comparatively limited volume of air directed through those spaces attains a relatively high velocity for maximum effectiveness. The interior angle of the deflectors is preferably in the range from 70° to 90°, as this has been found to be the most effective range of angle of the deflectors to develop the desired air curtain. The weight of the components added to a conventional soldering iron to realize the embodiments of the present invention is slight, so that the soldering iron of my invention may be easily balanced and held by a user for the extended periods of time that are encountered during a work shift. The mounting of the motor near the upper end of the soldering iron handle as shown in the embodiment of FIG. 4 provides a certain counterbalance for the extended soldering iron tip and the weight of the deflectors which are added below the handle. All in all, products embodying my invention enhance the comfort and safety of the work place while providing tools that are easily used by an operator.

There have been shown and described various particular arrangements in accordance with the invention of electrical soldering irons which contain means for directing air through the handle of the iron, exiting about the tip of the soldering iron in a hollow cone-shaped curtain of air which serves to entrain and remove the fumes which are generated in the vicinity of the soldering iron tip, generally from heated flux. This curtain of air also serves to dissipate heat from the soldering iron heating element which would otherwise reach the handle of the soldering iron. As a result of the embodiments of my invention which are disclosed herein, both the safety and comfort of the user of my soldering iron are enhanced. The finger gripping portion of the handle is maintained cool and comfortable to the touch, and the fumes which are normally generated in the soldering process are removed from the work site so that the user's breathing is not impaired and the previously existing health hazard is eliminated. Accordingly, any and all modifications, variations or equivalent arrangements which may occur to those skilled in the art should be considered to be within the scope of the invention as defined in the annexed claims.

What is claimed is:

1. An electrical soldering iron comprising:
    a handle having at least a portion which is hollow and an air inlet portion communicating with the hollow portion;
    a soldering portion extending longitudinally from the handle and having a soldering tip with a resistive heating element coupled thereto for heating the tip;
    air deflecting means extending from the handle and surrounding at least part of the soldering portion adjacent the handle, said deflecting means having an outlet for directing forced air in a thin air curtain surrounding and spaced from the tip to prevent fumes which may be formed in the vicinity of the tip from reaching the user of the iron, said air deflecting means having an inlet communicating with the hollow portion of the handle; and
    means in said handle and cooperating with said handle air inlet to produce a pressurized flow of ambient air from said inlet portion through the hollow portion of the handle into said air deflecting means to exit along the air deflecting means and form the air curtain;
    wherein air deflecting means comprise a thin channel for directing said pressurized flow of ambient air to form said curtain; and
    wherein said means in said handle comprise a motor and fan mounted within the hollow portion of the handle, the fan being positioned adjacent said inlet of the air deflecting means and mounted on a shaft of the motor to force air into the deflecting means, the handle including a housing defining the hollow portion of said handle and having at least one opening situated between the motor and the fan for admitting air to be driven by the fan.

2. The device of claim 1 wherein said motor and fan are positioned adjacent opposite ends of the hollow portion of the handle, the shaft being of extended length to position the motor to counterbalance the handle relative to the soldering portion of the soldering iron.

3. The device of claim 2 further including a support bracket extending from an inner wall of the housing and containing a bearing surrounding the shaft, the bracket having openings extending therethrough to permit air to flow along the shaft toward the fan.

4. The device of claim 3 wherein the hollow handle portion is provided with a plurality of openings both above and below the support bracket for admitting air into the hollow portion of the handle above the fan.

5. An electrical soldering iron comprising:
a handle having at least a portion which is hollow and an air inlet portion communicating with the hollow portion;
a soldering portion extending longitudinally from the handle and having a soldering tip with a resistive heating element coupled thereto for heating the tip;
air deflecting means extending from the handle and surrounding at least part of the soldering portion adjacent the handle, said deflecting means having an outlet for directing forced air in a thin air curtain surrounding and spaced from the tip to prevent fumes which may be formed in the vicinity of the tip from reaching the user of the iron, said air deflecting means having an inlet communicating with the hollow portion of the handle;
blower means mounted between said handle inlet portion and said air deflecting means for directing ambient air through the hollow portion of the handle into said air deflecting means to exit along the air deflecting means and form the air curtain; and
a motor mounted within the hollow portion of the handle and coupled to drive said blower means to force ambient air from the handle inlet portion into the deflecting means.

6. The device of claim 5 wherein said air deflecting means comprise a thin cone-shaped channel for directing the forced air to form said curtain.

7. The device of claim 6 wherein the air deflecting means comprise a pair of nested spaced annular wall members resembling truncated cone sections, said wall members being generally parallel to each other and spaced apart but in close proximity to each other to define a thin annular space as said thin channel for directing air forced therethrough to form a generally cone-shaped air curtain exiting the deflecting means.

8. The device of claim 7 wherein the outer wall member of said nested pair is attached to said handle.

9. The device of claim 8 wherein said outer wall member includes at least one inwardly, protruding spacing element for supporting the inner wall member of said pair and defining the transverse dimension of said thin annular space.

10. The device of claim 9 wherein said inner wall member includes means defining a central opening for receiving and supporting a base of the soldering portion.

11. The device of claim 10 further including means for mounting said base to said inner wall member within said opening.

12. The device of claim 9 wherein the inner wall member is spaced from the outer wall member by approximately 0.02 inches throughout the major extent of the annular space established between them.

13. The device of claim 7 wherein said outer wall member is integrally formed with said handle.

14. The device of claim 13 wherein said inner and outer wall members have included angles, when projected, which are substantially equal.

15. The device of claim 14 wherein the included angles of said wall members are within the range of from 70° and 90°.

* * * * *